(12) United States Patent
Sun et al.

(10) Patent No.: US 10,396,934 B2
(45) Date of Patent: Aug. 27, 2019

(54) METHOD FOR CHANNEL QUALITY REPORT

(71) Applicant: MediaTek Singapore Pte. Ltd., Singapore (SG)

(72) Inventors: Feifei Sun, Beijing (CN); Xiangyang Zhuang, Lake Zurich, IL (US); Hua-Min Chen, Beijing (CN)

(73) Assignee: HFI Innovation INC., HsinChu (TW)

( * ) Notice: Subject to any disclaimer, the term of this patent is extended or adjusted under 35 U.S.C. 154(b) by 23 days.

(21) Appl. No.: 15/033,900

(22) PCT Filed: Nov. 4, 2014

(86) PCT No.: PCT/CN2014/090268
§ 371 (c)(1),
(2) Date: May 2, 2016

(87) PCT Pub. No.: WO2015/062557
PCT Pub. Date: May 7, 2015

(65) Prior Publication Data
US 2016/0269146 A1    Sep. 15, 2016

(30) Foreign Application Priority Data

Nov. 4, 2013    (CN) .......................... 2013 1 0537763

(51) Int. Cl.
*H04L 1/00*    (2006.01)
*H04L 1/08*    (2006.01)
(Continued)

(52) U.S. Cl.
CPC .......... *H04L 1/0026* (2013.01); *H04L 1/0009* (2013.01); *H04L 1/08* (2013.01); *H04L 1/20* (2013.01); *H04L 5/0048* (2013.01)

(58) Field of Classification Search
CPC ....... H04L 1/0009; H04L 1/0026; H04L 1/08; H04L 1/20; H04L 1/1858; H04L 5/0048
See application file for complete search history.

(56) References Cited

U.S. PATENT DOCUMENTS

| | | | |
|---|---|---|---|
| 2009/0163199 A1 | 6/2009 | Kazmi | |
| 2013/0121216 A1* | 5/2013 | Chen | ..................... H04L 1/1835 370/280 |
| 2016/0182208 A1* | 6/2016 | Yi | ......................... H04L 1/0026 370/329 |

FOREIGN PATENT DOCUMENTS

| | | |
|---|---|---|
| CN | 101282194 A | 10/2008 |
| CN | 101958781 A | 1/2011 |

(Continued)

OTHER PUBLICATIONS

Mediatek Inc., Discussion on CSI report in coverage enhancement, 3GPP TSG-RAN WG1 #76, Feb. 10-14, 2014, R1-140241, XP050735794, Prague, Czech Republic.

(Continued)

*Primary Examiner* — Asad M Nawaz
*Assistant Examiner* — Saad A. Waqas
(74) *Attorney, Agent, or Firm* — Imperium Patent Works; Helen Mao (57) ABSTRACT

Apparatus and methods are provided to report channel status with transmission repetition. In one novel aspect, the mobile station computes a transmission efficiency for a transport block, which is repeatedly transmitted such that the transport block is received with a predefined receiving quality; determines a channel quality indicator based on the transmission efficiency and transmits it to a base station. In one embodiment, the transport block is repeatedly transmitted over multiple subframes. In another novel aspect, the mobile station computes a plurality of transmission efficiencies corresponding to a plurality of transport blocks, wherein at (Continued)

least one transport block is repeatedly transmitted such that each transport block is received with a pre-defined receiving quality. The mobile station determines one or more channel quality indicators based on the transmission efficiencies and transmits either the channel quality indicator with the highest efficiency or each channel quality indicator to a base station.

25 Claims, 7 Drawing Sheets

(51) Int. Cl.
*H04L 1/20* (2006.01)
*H04L 5/00* (2006.01)

(56) References Cited

FOREIGN PATENT DOCUMENTS

| | | | |
|---|---|---|---|
| CN | 102802191 | A | 11/2012 |
| EP | 3 041 154 | A1 | 7/2016 |
| WO | 2013082549 | A1 | 6/2013 |

OTHER PUBLICATIONS

"International Search Report" dated Feb. 10, 2015 for International application No. PCT/CN2014/090268, International filing date:Nov. 4, 2014.

* cited by examiner

| Index | Transmission efficiency | Repetition number |
|---|---|---|
| 0 | Out of range | - |
| 1 | 0.008 | 32 |
| 2 | 0.015 | 16 |
| 3 | 0.03 | 8 |
| 4 | 0.06 | 4 |
| 5 | 0.12 | 2 |
| 6 | 0.24 | 1 |
| 7 | 0.377 | 0 |

Fig. 7

| Index | Transmission efficiency |
|---|---|
| 0 | Out of range |
| 1 | 0.01 |
| 2 | 0.08 |
| 3 | 0.18 |
| 4 | 0.27 |
| 5 | 0.36 |
| 6 | 0.45 |
| 7 | 0.5 |

Fig. 8

| Index | TBS (bit) |
|---|---|
| 0 | Out of range |
| 1 | 40 |
| 2 | 120 |
| 3 | 352 |
| 4 | 496 |
| 5 | 640 |
| 6 | 800 |
| 7 | Larger than 1000 |

METHOD FOR CHANNEL QUALITY REPORT

CROSS REFERENCE TO RELATED APPLICATIONS

This application claims priority of CN Application No. 201310537763.5, entitled "METHOD FOR CHANNEL QUALITY REPORT" filed on Nov. 4, 2013; the subject matter of which is incorporated herein by reference.

FIELD OF THE INVENTION

The disclosed embodiments relate generally to wireless communication systems, and, more particularly, to method for channel quality report.

BACKGROUND AND RELATED ART

Third generation partnership project (3GPP) and Long Term Evolution (LTE) mobile telecommunication systems provide high data rate, lower latency and improved system performances. However, such systems are optimized for regular data communications. Normally there is no need for repeatedly retransmissions. Therefore, the current related information about channel quality does not consider the repetition of transmission. For example, the transmission efficiency as a measure of channel quality does not take into account the number of repetition needed to achieve a certain quality.

As the applications in mobile networks evolve, reliable channel status report is needed to take into account the repetition in transmission. For example, some UEs, in the basements of residential buildings or locations shielded by foil-backed insulation, metalized windows or traditional thick-walled building construction, may experience significantly larger penetration losses on the radio interface than normal LTE devices. More resources/power is needed to support these UEs in the extreme coverage scenario. Repetition has been identified as a common technique to bridge the additional penetration losses than normal LTE devices. The existing status report does not consider the factor of repetition transmission. Therefore, such status report does not accurately reflect the status when transmission repetition is used.

Improvements and enhancements are required for a channel status report considering repetition in transmission.

BRIEF SUMMARY OF THE INVENTION

Apparatus and methods are provided to report channel status by a mobile station with transmission repetition. In one novel aspect, the mobile station computes a transmission efficiency for a transport block. The transport block is repeatedly transmitted with a repetition number greater than zero, such that the transport block is received with a pre-defined receiving quality. The mobile station determines a channel quality indicator based on at least the computed transmission efficiency. The mobile station transmits the determined channel quality indicator to a base station. In one embodiment, the transport block is repeatedly transmitted over multiple subframes. In another embodiment, the transmission efficiency is computed based on a size of the transport block, a number of resource elements used in each repetition, and the repetition number. In yet another embodiment, the transmission efficiency is further based on one or more transmission parameters comprising: a modulation order, a transmission mode, a coding scheme, and a redundancy version number. In one embodiment, the pre-defined receiving quality is a pre-defined block error probability. In another embodiment, the channel quality indicator indicates the repetition number corresponding to the size of the transport block. In yet another embodiment, the channel quality indicator indicates the size of the transport block corresponding to the repetition number. In one embodiment, the transport block size is either dynamically determined by the mobile station, or is predefined, or is configured by a higher-layer message from the base station. In another embodiment, the repetition number is either dynamically determined by the mobile station, or is predefined, or is configured by a higher-layer message from the base station. In one embodiment, the transmission efficiency is based on reference signals received over multiple subframes. In one embodiment, the reference signals are cell-specific reference signals. In another embodiment, the reference signals are channel status information reference signals.

In another novel aspect, the mobile station computes a plurality of transmission efficiencies corresponding to a plurality of transport blocks, wherein at least one transport black is repeatedly transmitted such that each transport block is received with a pre-defined receiving quality. The mobile station determines one or more channel quality indicators based on the computed one or more transmission efficiencies and transmits the channel quality indicators to a base station. In one embodiment, the channel status indicator corresponds to the highest transmission efficiency. In another embodiment, the channel quality indicator corresponds to each of the computed transmission efficiencies.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION OF THE INVENTION

Reference will now be made in detail to some embodiments of the invention, examples of which are illustrated in the accompanying drawings.

Figure 1:
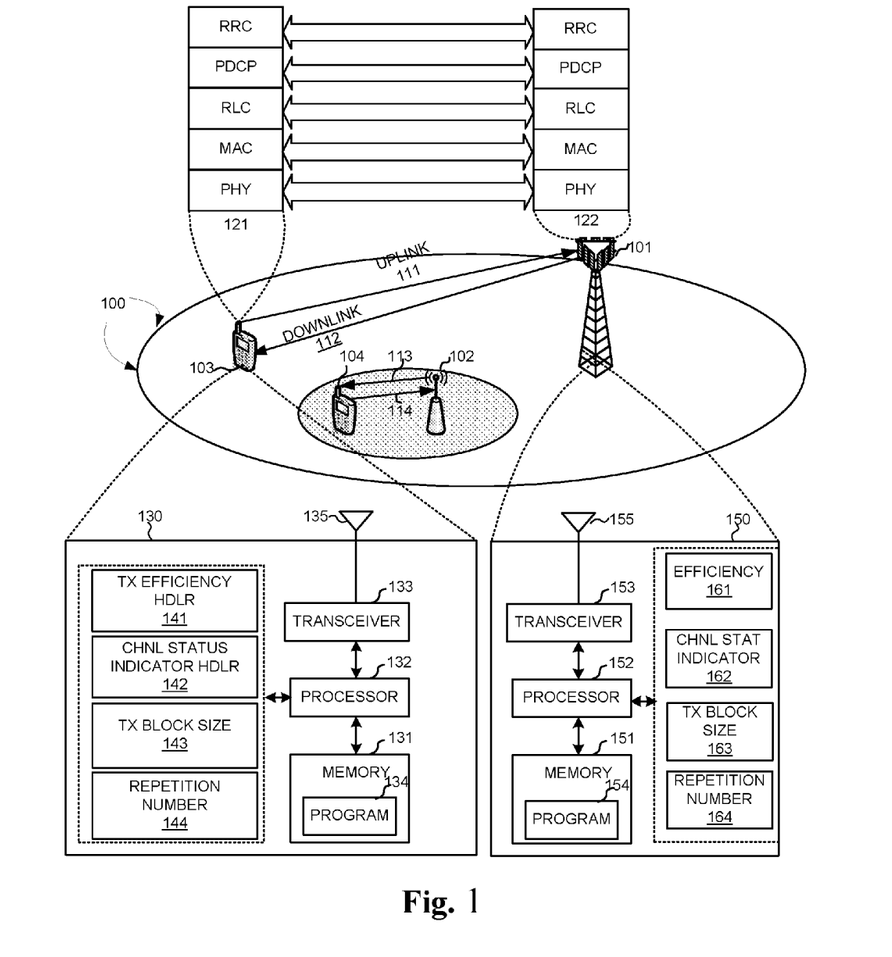
FIG. 1 illustrates an exemplary mobile communication network with UEs report channel status based on the number of repetitions needed for the transmission in accordance with embodiments of the current invention.

FIG. 1 illustrates an exemplary mobile communication network 10 with UEs reporting channel status based on the number of repetitions needed for the transmission in accordance with embodiments of the current invention. Wireless communication system 100 includes one or more fixed base infrastructure units forming a network distributed over a geographical region. The base unit may also be referred to as an access point, access terminal, base station, Node-B, eNode-B (eNB), or by other terminology used in the art. In FIG. 1, the one or more base stations 101 and 102 serve a number of mobile stations 103 and 104 within a serving area, for example, a cell, or within a cell sector. In some systems, one or more base stations are communicably coupled to a controller forming an access network that is communicably coupled to one or more core networks. The disclosure however is not intended to be limited to any particular wireless communication system.

Generally, serving base stations 101 and 102 transmit downlink communication signals 112 and 113 to mobile stations in the time and/or frequency domain. Mobile stations 103 and 104 communicate with one or more base units 101 and 102 via uplink communication signals 111 and 114. In one embodiment, the communication system utilizes OFDMA or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remotes units are served by assigning downlink or uplink radio resources that typically consist of a set of sub-carriers over one or more OFDM symbols. Exemplary OFDMA based protocols include the developing Long Term Evolution (LTE) of the 3GPP UMTS standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, communication system may utilize other cellular communication system protocols including, but not limited to, TDMA or direct sequence CDMA.

In FIG. 1, mobile communication network 100 is an OFDM/OFDMA system comprising multiple base stations, such as eNB 101, eNB 102 and a plurality of mobile stations/UEs, such as mobile station 103 and mobile station 104. When there is a downlink packet to be sent from a base station to a mobile station, each mobile station gets a downlink assignment, e.g., a set of radio resources in a physical downlink shared channel (PDSCH). When a UE needs to send a packet to a base station in the uplink, the UE gets a grant from the base station that assigns a physical downlink uplink shared channel (PUSCH) consisting of a set of uplink radio resources. In 3GPP LTE system based on OFDMA downlink, the radio resource is partitioned into subframes each of which comprises two slots and each slot has seven OFDMA symbols, in the case of normal Cyclic Prefix (CP). Each OFDMA symbol further comprises a number of OFDMA subcarriers depending on the system bandwidth. The basic unit of the radio resource grid is called Resource Element (RE), which spans an OFDMA subcarrier over one OFDMA symbol. One type of the basic block of the radio resources for scheduling in LTE is called physical resource block (PRB), each of which contains several consecutive OFDM symbols in one subframe and several consecutive subcarriers in the frequency domain. Virtual resource blocks (VRB) is another type of the basic block of the radio resources defined in the LTE system. The VRB has two types: the localized type and the distributed type. For each type of virtual resource blocks, a pair of virtual resource blocks over two slots in a subframe is assigned together with a single virtual resource block number. One downlink assignment or an uplink grant consists of one or multiple basic blocks of the radio resources, e.g., a set of PRBs.

Due to wireless channel selectivity in frequency domain, a mobile station may measure the channel status based on some reference signals and report the channel quality of full-band or sub-band of the system bandwidth to a base station. The base station may select a set of radio resources, which can provide better performance for the mobile station. In order to achieve a target performance, the base station may also decide the amount of radio resources needed or which set of radio resources to transmit the PDSCH based on the reported channel quality.

There are several metrics to measure and report the channel status, such as reference signal receiving power (RSRP), channel quality indicator (CQI), pre-coding matrix indicator (PMI), and rank indication (RI). RSRP is a rough channel status and the base station using RSRP and related measurement for handover decision. Some other metrics like CQI, PMI and RI represent a more accurate channel quality. For example, in LTE system, CQI represents a derived efficiency with some hypothesis, such as a set of REs in a group of PRBs in one subframe. However, repetition across multiple subframes for a data channel may be required in some situations. For example, for the mobile station in coverage hole (e.g., one working item in 3GPP: Low cost & enhanced coverage MTC UE for LTE is to improve 15 dB coverage), repetition across multiple subframes of PDSCH is one of the solutions to improve the coverage. Theoretically, to provide addition 3 dB performance gain, double resources/repetitions are required. When considering the channel estimation error, more than double resources/repetitions are expected. Therefore, the spectral efficiency will degrade to support UEs required coverage improvement. In order to allocate the resource properly to the UE that needs repetitions, it is important to report the channel quality to the eNB such that the eNB can use proper resources for each downlink transmission. A reliable channel quality report will help to improve the resource utilization by only allocating necessary resources to the UE, which can bridge coverage enhancement or achieve the performance requirement. However, crucial problems remain as to how to exchange channel quality information between the UE and the eNB and the kind of measurement to indicate the channel quality. The current invention provides methods and apparatus to address the channel-status-report issue for transmission repetition. The benefit of the improved channel status report is not limited to the examples above.

In another example, to improve the reliability of a data channel transmission, radio resource from multiple subframes may be bundled together for one traffic packet. In these cases, repetition number/subframe number is an important factor for the mobile station to calculate the transmission efficiency that current channel status can achieve.

In one embodiment of the invention, a method for a channel quality report to a base station by a mobile station, the method comprises: computing a first transmission efficiency corresponding to a first transport block, wherein the first transport block can be received with a pre-defined quality if the first transport block is repeatedly transmitted over multiple subframes with a first number of repetitions; and reporting a channel quality indicator based on at least the first computed transmission efficiency. In one example, the pre-defined quality is a predefined block error probability. In one embodiment, the first transmission efficiency corresponding to the first transport block is calculated based on the size of the first transport block, the number of resource elements used in each repetition, and the first number of repetitions. In one example, the size of the first transport block is the information bit number of a traffic block. In another example, the size of the first transport block is the information bit number of a traffic block plus number of CRC. As a result, there are some metrics to report the channel quality. In one embodiment, the reported channel quality indicator indicates the first number of repetitions corresponding to the size of the first transport block. For example, with a pre-defined or configured transport block size (TBS), the mobile station can report the number of repetitions needed to achieve the pre-defined quality. In one example, the size of first transport block can be determined by the mobile station. Alternatively, the size of first transport block can be pre-defined or configured by a higher-layer message from the base station. In another embodiment, the reported channel quality indicator indicates the size of the first transport block corresponding to the first number of repetitions. For example, with a pre-defined or configured repetition numbers, the mobile station can report the transport block size that can be received with the pre-defined quality. In one example, the first number of repetitions, which is greater than zero, is from a pre-determined value set. For example, the first number of repetition is selected by the mobile station. Alternatively, the first number of repetition is configured by the base station. It is also noted that one transmission/repetition of the transport block may span in one subframe or multiple subframes. One transmission/repetition of the transport block can also only occupy partial radio resources in one subframe and the rest of radio resources in the subframe can be used for another repetition. The repetition number may be equal to the number of the multiple subframes. It can also be smaller or larger than the number of the multiple subframes.

In additional to the transport block size and the total resource elements used in the repeatedly transmission, the calculation of the first transmission efficiency of the first transport block further based on: a modulation order, or a transmission mode, or a coding scheme, or a redundancy version number.

Different receivers may obtain different performance under the same channel condition. For example, different channel estimation or decoding algorithms may need different repetition numbers to decode the same transport block size. On the other hand, different length of coding bits, wherein the coding bits are included in one TBS, may bring different channel coding gain, which may result in different required repetition number. Therefore, it may be helpful to report multiple transmission efficiencies (two or more) or the highest transmission efficiency among them. In another embodiment of the invention, the method for a channel quality report to a base station by a mobile station, the method further comprises: computing a second transmission efficiency corresponding to a second transport block, wherein the second transport block can be received with a pre-defined quality if the second transport block is repeatedly transmitted over multiple subframes with a second number of repetitions; reporting a channel quality indicator based on at least the first and second computed transmission efficiencies.

In one embodiment, the channel quality indicator corresponds to the highest transmission efficiency among the computed transmission efficiencies. In another embodiment, the reported channel quality indicator corresponds to each of the computed transmission efficiencies. For example, the mobile station computes all the transmission efficiencies based on a pre-known TBS set or a pre-known repetition number set. In one example, the mobile station selects the highest transmission efficiency and reports the indicator corresponding to it. For example, the mobile station may report a pair of the transport block size and the repetition number, with which the transport block can be received with the pre-defined quality. The highest transmission efficiency may not be achieved by the largest TBS or the smallest repetition number because of the receiver algorithm or the channel coding gain achieved with different TBSs. In another example, the mobile station can report all the pairs of TBS and repetition number that can be received with the pre-defined quality. Alternatively, the base station can configure a number of TBS and repetition number pairs and the base station can report the top pairs with the highest transmission efficiencies.

Several methods can be used at the mobile station to compute the transmission efficiency. In one embodiment, the method for the channel quality report further comprises computing the first transmission efficiency further based on reference signals received over multiple subframes. In one embodiment, the reference signals are cell-specific reference signals (CRS). In another example, the reference signals are channel-state information (CSI) reference signals. In addition, there are some other implementation methods. For example, the mobile station can derive the transmission efficiency based on the statistic of the successfully decoded or unsuccessfully decoded transport block size and the corresponding number of repetitions.

FIG. 1 also shows an exemplary diagram of protocol stacks for UE 103 and eNB 101. UE 103 has a protocol stack 121, which includes the physical (PHY) layer, the medium access control (MAC) layer, the radio link control (RLC)

layer, the pack data convergence protocol (PDCP) layer, and the radio resource control (RRC) layer. Similarly, eNB 101 has a protocol stack 122. Protocol stack 122 connects with protocol stack 121. The UE-eNB protocol stack 122 includes the PHY layer, the MAC layer, the RLC layer the PDCP layer and the RRC layer, each of which connects with their corresponding protocol stack of UE protocol stack 121.

FIG. 1 further illustrates simplified block diagrams 130 and 150 for UE 103 and eNB 101, respectively. Mobile station 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in mobile station 103. Memory 131 stores program instructions and data 134 to control the operations of mobile station 103.

Mobile station 103 also includes multiple function modules that carry out different tasks in accordance with embodiments of the current invention. A transmission efficiency handler 141 computes one or more transmission efficiencies for one or more transport blocks, which are repeatedly transmitted, based on predefine algorithm. A channel-status-indicator handler 142 determines a channel-status-indicator value based on at least the computed transmission efficiency for the corresponding transport block. A transmission-block-size handler 143 determines a transmission block size to achieve a predefined transmission quality based on at least the computed transmission efficiency. A repetition number handler 144 determines a repetition number for the transport block to achieve a predefined transmission quality based on at least the computed transmission efficiency for the transport block.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101.

eNB 101 also includes multiple function modules that carry out different tasks in accordance with embodiments of the current invention. A transmission efficiency handler 161 handles the transmission efficiency for the transport block. A channel-status-indicator handler 162 receives a channel status indicator from a UE and decodes it according to pre-defined algorithms. A transmission-block-size handler 163 determines a transmission block size. A repetition number handler 164 determines a repetition number for the transport block to achieve a predefined transmission.

Figure 2A:
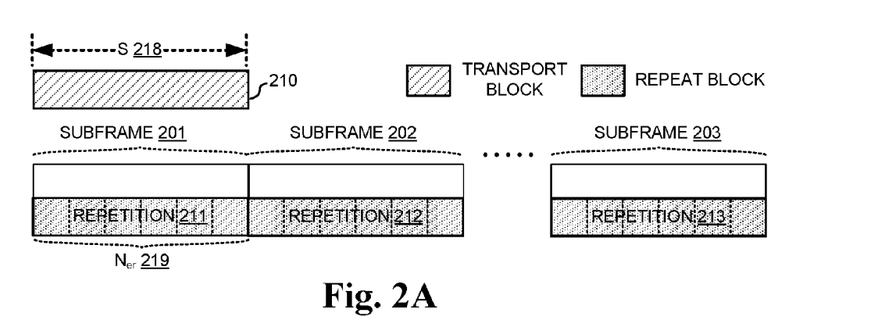
FIG. 2A illustrates an exemplary hypothesis of the transport block occupies one subframe with each repetition block occupies one subframe.
Figure 2B:
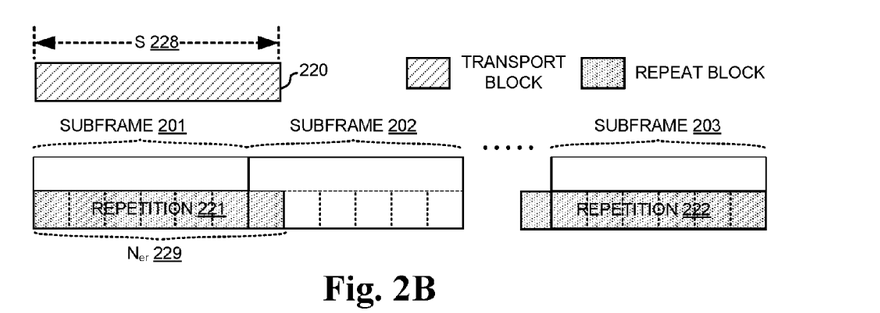
FIG. 2B illustrates an exemplary hypothesis of the transport block occupies more than one subframe with each repetition block occupies more than one subframe.
Figure 2C:
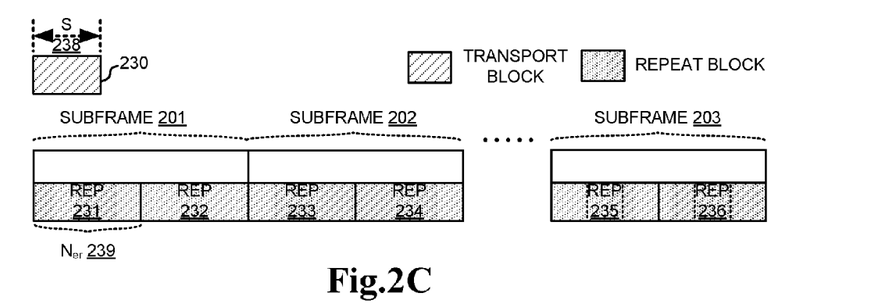
FIG. 2C illustrates an exemplary hypothesis of the transport block occupies less than one subframe with each repetition block occupies less than one subframe.

As the wireless network evolves with more applications, it is important to incorporate the repeatedly transmission in channel status report. There are different possible ways to transmit data blocks repeatedly. FIGS. 2A, 2B and 2C illustrate exemplary hypotheses of different scenarios of a transport block being repeatedly transmitted over multiple subframes with a repetition number.

FIG. 2A illustrates an exemplary hypothesis of the transport block occupies one subframe with each repetition block occupies one subframe. A transport block 210 with a transport block size (TBS) of S 218 occupies one subframe. In order to achieve a pre-defined quality, transport block 210 should be repeatedly transmitted over multiple subframes, with each repetition having a number of resource element equals to $N_{er}$ 219. In FIG. 2A, $N_{er}$ 219 equals to the number of resource elements in one subframe. Transport block 210 is repeatedly transmitted over subframes 201, 202 and 203 with repetition transport blocks of 211, 212 and 213. In one embodiment of the disclosure, a method for a channel quality report to a base station by a mobile station, the method comprises: computing a first transmission efficiency corresponding to a first transport block 210, wherein the first transport block can be received with a pre-defined quality if the first transport block 210 is repeatedly transmitted over multiple subframes (e.g., subframes 201, 201 and 203) with a first number of repetitions (for example, repetition 211, 212 and 213 are repeatedly transmission over multiple subframes 201, 201 and 203); and reporting a channel quality indicator based on at least the first computed transmission efficiency.

FIG. 2B illustrates an exemplary hypothesis of the transport block occupies more than one subframe with each repetition block occupies more than one subframe. A transport block 220 with a transport block size (TBS) of S 228 occupies more than one subframe. In order to achieve a pre-defined quality, transport block 220 should be repeatedly transmitted over multiple subframes, with each repetition having a number of resource element equals to $N_{er}$ 229. In FIG. 2B, $N_{er}$ 229 is larger than the number of resource elements in one subframe. Transport block 220 is repeatedly transmitted over subframes 201, 202 and 203 with repetition transport blocks of 221 and 222. In another embodiment, the method for a channel quality report to a base station by a mobile station, the method further comprises: computing a second transmission efficiency corresponding to a second transport block 220, wherein the second transport 220 block can be received with a pre-defined quality if the second transport block 220 is repeatedly transmitted over multiple subframes (e.g., subframe 201, 202 and 203) with a second number of repetitions (for example, repetition 221 and 222 are repeatedly transmission over multiple subframe 201, 202 and 203); reporting a channel quality indicator based on at least the first and second computed transmission efficiencies.

FIG. 2C illustrates an exemplary hypothesis of the transport block occupies less than one subframe with each repetition block occupies less than one subframe. A transport block 230 with a transport block size (TBS) of S 238 occupies less than one subframe. In order to achieve a pre-defined quality, transport block 230 should be repeatedly transmitted over multiple subframes, with each repetition having a number of resource element equals to $N_{er}$ 239. In FIG. 2C, $N_{er}$ 239 is smaller than the number of resource elements in one subframe. Transport block 230 is repeatedly transmitted over subframes 201, 202 and 203 with repetition transport blocks of 231 to 236.

As shown in FIGS. 2A to 2C, there are different possible ways to transmit a transport block repeatedly. The relationship between the transmission quality Q, the size of the transport block S and the repetition number $N_{rep}$ are used by the mobile station/UE to determine a channel status indicator. The functional relationship among the three parameters of Q, S and $N_{rep}$ may be determined by other factors such as a modulation order, or a transmission mode, or a coding scheme, or a redundancy version number.

In one embodiment, the transmission efficiency E corresponding to the transport block is calculated based on the size of the transport block S, the number of resource elements $n_{er}$ used in each repetition, and the number of repetitions $n_{rep}$. For example, $$E = \frac{S}{n_{er} \times n_{rep}}.$$

Figure 3:
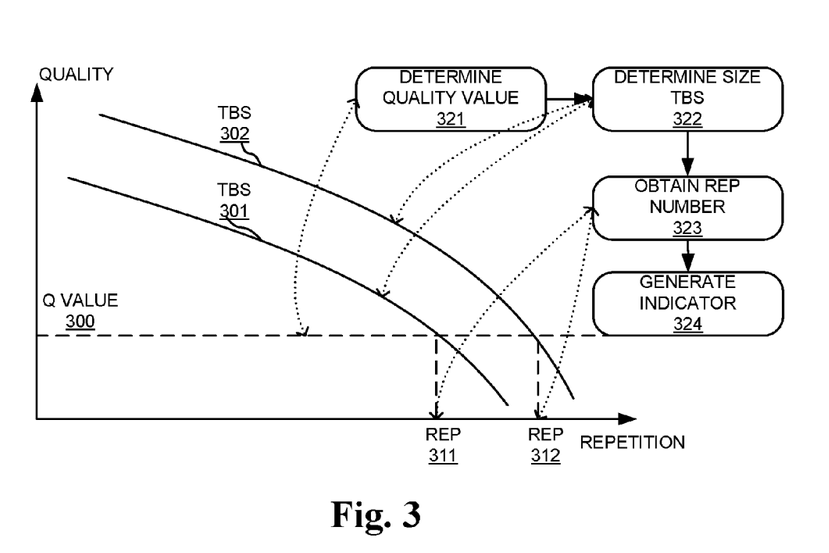
FIG. 3 illustrates an example of relationship between repetition number and a pre-defined quality under a certain channel condition with different transport block sizes.
Figure 4:
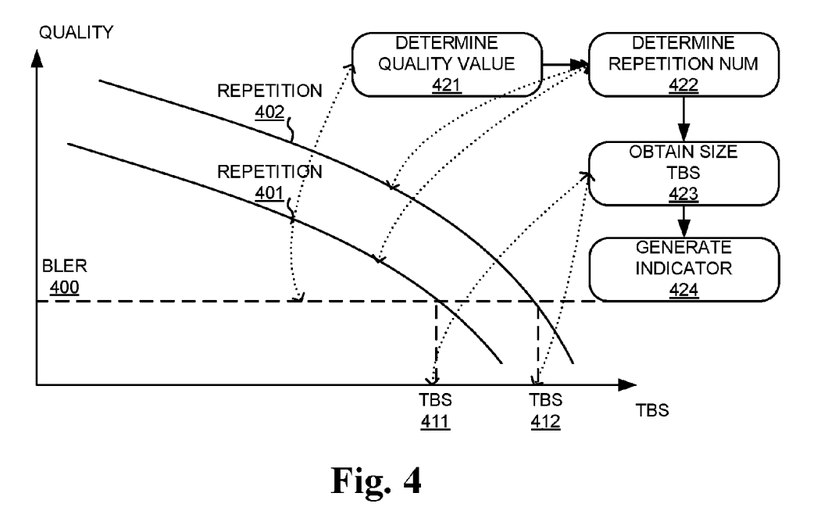
FIG. 4 illustrates an example of relationship between TBS and a pre-defined quality under a certain channel condition with different repetition numbers.
Figure 5:
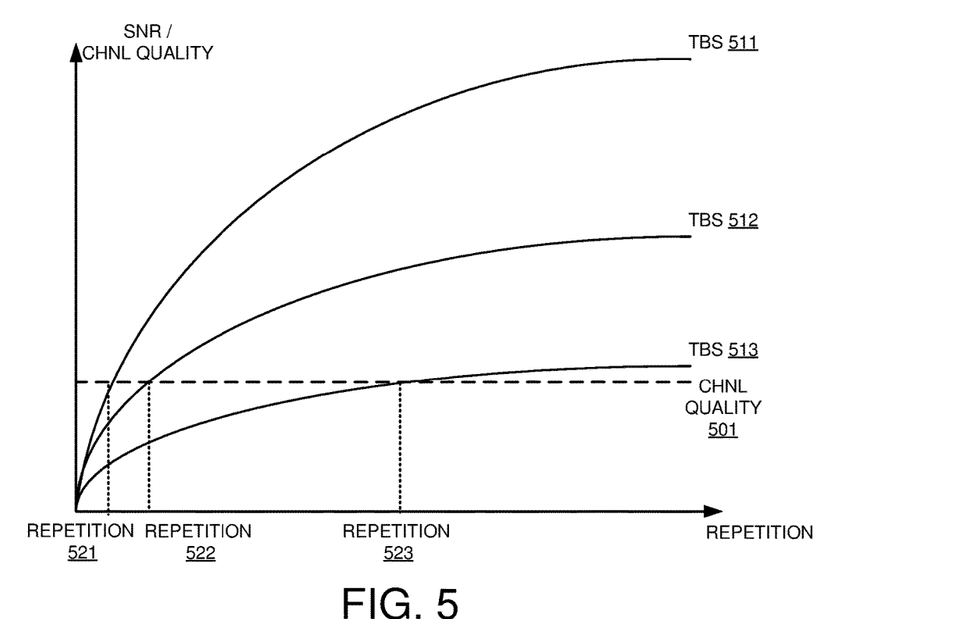
FIG. 5 illustrates an example of relationship between TBS and repetition number under different channel conditions to be received with a given quality.

In one example, the number of resource elements (REs) $n_{er}$ used in each repetition is further calculated based on the PRB number $n_p$ occupied by each repetition and the number of available resource elements $n_{ep}$ in each PRB, i.e., $n_p = n_p \times n_{ep}$. In the LTE system, for normal CP one PRB consists of 168 REs and some REs may be occupied by control signaling or used as reference signals. For example, the mobile station may pre-know the first three OFDM symbols are occupied by control signaling and some REs are occupied by reference signals. In addition, the mobile station may also know the ratio of PDSCH energy per resource element (EPRE) to cell-specific RS EPRE to derive the transmission efficiency (EPRE may impact the decoding performance). In additional to the transport block size and the total resource elements used in the repeatedly transmission, the calculation of the first transmission efficiency of the first transport block further based on: a modulation order, or a transmission mode, or a coding scheme, or a redundancy version number. For example, the mobile station assumes QPSK modulation, transmit diversity scheme, turbo coding and redundancy version zero. The code rate may be further configured or pre-defined, for example, the mobile station may assume ⅓ turbo coding. FIG. 3 to FIG. 5 show relationships between Q, S and $N_{rep}$.

FIG. 3 illustrates an example of relationship between repetition number and a pre-defined quality under a certain channel condition with different transport block sizes. FIG. 3 shows two exemplary graphs of transmission quality v. repetition number for two different TB sizes, TBS 301 and TBS 302. The mobile station at step 321 determines a threshold quality value 300. At step 322, the mobile station determines a size for the transport block, for example TBS 301 or TBS 302. Based on the result of step 322, the mobile station determines which graph to use. At step 323, the mobile station obtains the repetition number, repetition 311 for TBS 301 or repetition 312 for TBS 302, based on the selected graph. At step 324, the mobile station generates one or more channel status indicator based on the repetition number. In one example, the mobile station knows the TBS 301. For example, the TBS 301 is pre-defined or configured by the base station. In another example, the TBS 301 can be determined by the mobile station. The mobile station can derive the number of repetitions 311 needed to achieve the pre-defined quality 300. In one embodiment, the pre-defined quality is a predefined block error probability, for example BLER (block error rate)=10%. In another example, more than one TBS (e.g., TBS 301 and 302) are pre-defined or configured for the mobile station to compute the transmission efficiencies. For example, the mobile station derives the number of repetitions 311 for TBS 301. Furthermore, the mobile station derives the number of repetitions 312 for TBS 302. In one embodiment, the reported channel quality indicator indicates the first number of repetitions 311 corresponding to the size of the first transport block 301. In another embodiment, the reported channel quality indicator indicates each of the number of repetitions 311 and 312. Moreover, the mobile station may report the pair of the size of the transport block and the repetition number, for example {TBS 301, number of repetitions 311} and/or {TBS 302, number of repetitions 312}.

FIG. 4 illustrates an example of relationship between TBS and a pre-defined quality under a certain channel condition with different repetition numbers. FIG. 4 shows two exemplary graphs of transmission v. TBS for two different repetition numbers, repetition 401 and repetition 402. The mobile station at step 421 determines a threshold quality value 400. At step 422, the mobile station determines a repetition number for the transport block, for example repetition 401 or repetition 402. Based on the result of step 422, the mobile station determines which graph to use. At step 423, the mobile station obtains the TBS based on the graph, TBS 411 for repetition 401 or TBS 412 for repetition 402. At step 424, the mobile station generates one or more channel status indicator based on the TBS. In one embodiment, the mobile station knows the number of repetitions 401. For example, the number of repetitions 401 is pre-defined or configured by the base station. The mobile station can compute the transport block size 411 can be received with the pre-defined quality by repeatedly transmission over multiple subframes with the number of repetitions 401. In one example, the first number of repetitions is from a pre-determined value set, for example value set {401, 402} or value set {401}. The mobile station can select a number of repetitions (e.g., repetition number 402). Alternatively, the first number of repetition (e.g., 401) is configured by the base station. In addition, the base station may further configure a second number of repetitions (e.g., 402). In one embodiment, the mobile station derives TBS 411 for the number 401 of repetitions, where the TBS 411 can be received with a pre-defined quality with the number 401 of repetitions. Furthermore, the mobile station derives TBS 402 for the number of repetitions 412 if there are a second number of repetitions configured by the based station or selected by the mobile station. In one embodiment, the reported channel quality indicator indicates the first transport block size 411 corresponding to the first number of repetitions 401. In another embodiment, the reported channel quality indicator indicates each of the transport block size 401 and 402.

FIG. 5 illustrates an example of relationship between TBS and repetition number under different channel conditions to be received with a given quality. To achieve a pre-defined quality, for example, BLER=10%, under the channel quality 501, TBS 511, 512 and 513 can be received with the pre-defined quality if the transport block is repeatedly transmitted over multiple subframes with repetition number 521, 522 and 523 respectively by the mobile station. In one embodiment, the based station can configured a TBS 511 and the mobile station reports the channel quality indicator corresponding to the repetition number 521. In another example, the based station configured multiple TBS 511, 512 and 513 to the mobile station. The mobile station computed the transmission efficiencies corresponding to each TBS, $$E_i = \frac{S_i}{n_{er} \times n_{rep_i}}.$$

In one embodiment, the mobile station reports the channel quality indicator corresponding to the highest transmission efficiency $E_{max} = \max\{E_i\}$ among the computed transmission efficiency $E_i$. In another example, the mobile station reports the corresponding repetition number $n_{rep_m}$ corresponding to the highest transmission efficiency $E_{max}$. In another embodiment, the base station configures one repetition number 521, and the mobile station reports the corresponding TBS 511. In another example, the base station configures multiple repetition number 521, 522, and 523. The mobile station reports each of the corresponding TBS 511, 512 and 513, or pairs of TBS and repetition number, for example {TBS 511, repetition number 521}, {TBS 512, repetition number 522} and {TBS 513, repetition number 523}. In another example, the mobile station reports the TBS and repetition number pair with highest transmission efficiency, for example {TBS 512, repetition number 522}.

Figure 6:
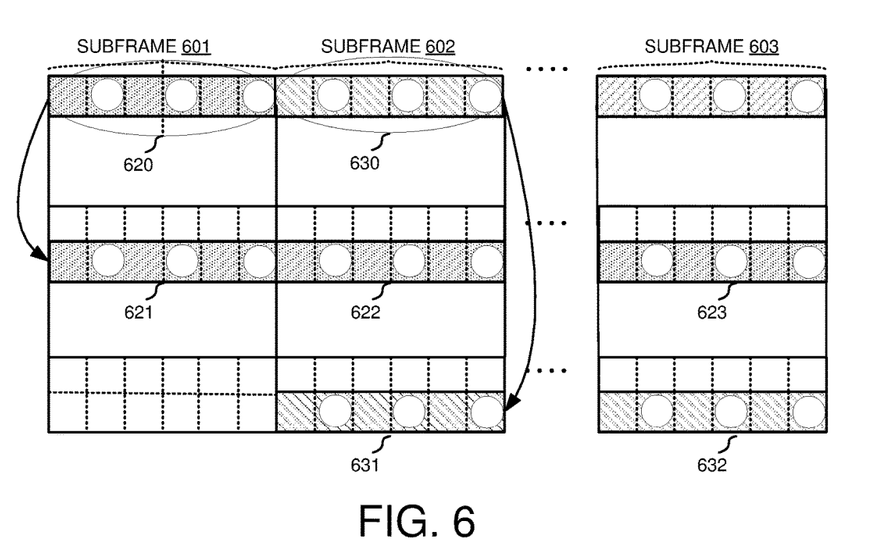
FIG. 6 illustrates exemplary diagrams of reference signals received over multiple subframes being repeatedly transmitted in accordance with embodiments of the current invention.

FIG. 6 illustrates exemplary diagrams of reference signals received over multiple subframes being repeatedly transmitted in accordance with embodiments of the current invention. In one embodiment, the mobile station can receive reference signals 611, 612 and 613 over multiple subframes with number 601, 602 and 603. Based on the reference signals 611, 612 and 613, the mobile station computes the transmission efficiency corresponding to the transport block 620, where the transport block 620 can be received with a pre-defined quality if the transport block 620 is repeatedly transmitted over multiple subframes 601, 602, 603 with a number of repetitions (e.g., repetition 621, 622, and 623). In one embodiment, the reference signals 611, 612 and 613 are CRS. In another embodiment, the reference signals 611, 612 and 613 are CSI-RS. UE may use reference signals 611, 612 and 613 spanning over multiple subframes 601, 602, and 603, and compute the transmission efficiency corresponding to the transport block 630, where the transport block 630 can be received with a pre-defined quality if the transport block 630 is repeatedly transmitted over the multiple subframes 602, 603 with a number of repetitions (e.g., repetition 631, and 632). In this example, the number of multiple subframes (subframe 601, 602 and 603) transmitting reference signals is not equal to the number of multiple subframes (subframe 602 and 603) using for repetition.

Figure 7:
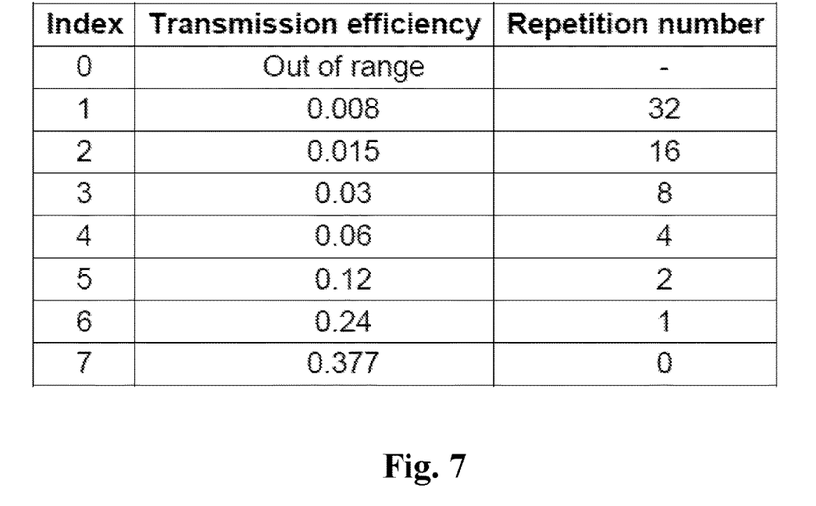
FIG. 7 illustrates an exemplary table of the channel quality indicator based on the transmission efficiency corresponding to the repetition number.
Figure 8:
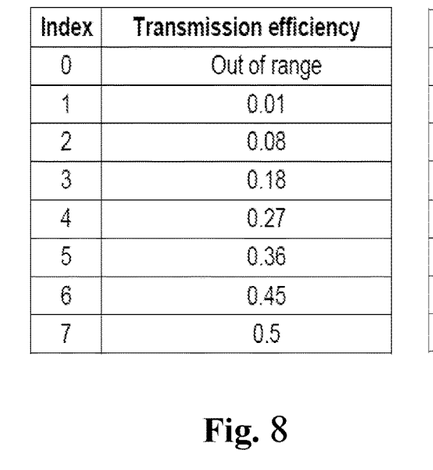
FIG. 8 illustrates an exemplary table of a mapping rule between each channel status index and the transmission efficiency.
Figure 9:
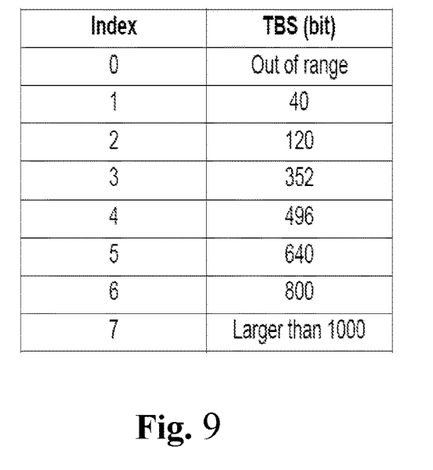
FIG. 9 illustrates an exemplary table of the channel quality indicator based on the transmission efficiency corresponding to TBS.

Upon determining the transmission efficiency, the mobile station determines one or more channel status indicators and transmits the one more channel status indicators to the base station. FIG. 7 to FIG. 9 show exemplary tables to obtain such channel status indicators.

FIG. 7 illustrates an exemplary table of the channel quality indicator based on the transmission efficiency corresponding to the repetition number. The mobile station assumes a pre-determined TBS and RE number in each repetition. For example, each TBS=152 bits data+24 bits CRC, there are one hundred and twenty REs in each PRB, and there are six PRBs for each repetition. The mobile station computes the transmission efficiency with the pre-known hypothesis, where the transport block with a pre-determined TBS can be received in a pre-defined quality. The mobile station looks into the predefined Table in FIG. 7, finds the closest transmission efficiency indicated by the index, and reports the index to the base station. In one example, one of the indexes represents "out of range", e.g., Index-0. This indicates the base station cannot support repeatedly transmission or indicates a low transmission efficiency because the mobile station is out of coverage. In another example, one of the indexes represents no repetition with the repetition number equals to zero. This indicates even without repetition the mobile station can receive a larger TBS than the pre-determined value with a higher transmission efficiency. For example, in FIG. 7, Index-7 corresponds to repetition number of zero, indicating no repeatedly transmission is needed. In this scenario, the mobile station works in a normal coverage mode instead of a coverage enhancement mode.

FIG. 8 illustrates an exemplary table of a mapping rule between each channel status index and the transmission efficiency. In one embodiment, the base station may configure a transmission efficiency range between the highest and lowest index. The mobile station calculates the transmission efficiency of each index. For example, the base station may configure an efficiency range of {0.01, 0.5}. The mobile station has three bits to indicate eight levels. Subsequently, the mobile station may calculate a mapping rule between each index and transmission efficiency as shown in FIG. 8.

In another embodiment, the mobile station may assume multiple TBSs and computes multiple transmission efficiencies and/or corresponding repetition numbers. For example, the mobile station computes the transmission efficiencies and derives index-1 and index-3 for pre-determined TBS-1 and TBS-2 respectively. The mobile station may report multiple indexes under different TBSs, e.g., Index-1 for TBS-1 and Index-3 for TBS-2. Alternatively, the mobile station may report the highest transmission efficiency, e.g., Index-3 with TBS-2.

FIG. 9 illustrates an exemplary table of the channel quality indicator based on the transmission efficiency corresponding to TBS. The mobile station assumes a pre-determined repetition number or a pre-determined set of repetitions and RE number in each repetition, for example, twenty repetitions and one hundred and twenty REs in each PRB, with six PRBs for each repetition. The mobile station computes the transmission efficiency with the pre-known hypothesis. For example, UE computes a TBS, where the transport block with the computed TBS can be received in a pre-defined quality. The mobile station looks into the predefined table in FIG. 9, finds the closest TBS indicated by the index, and reports the index to the base station. In another example, a set of repetition numbers, for example, {10, 20, 40}, is pre-known to the mobile station. The mobile station reports the index, e.g., Index-4, representing the closest TBS providing the highest transmission efficiency. In another example, the mobile station reports each of the index {3, 4, 3} corresponding to each repetition number {10, 20, 40} in the set.

Figure 10:
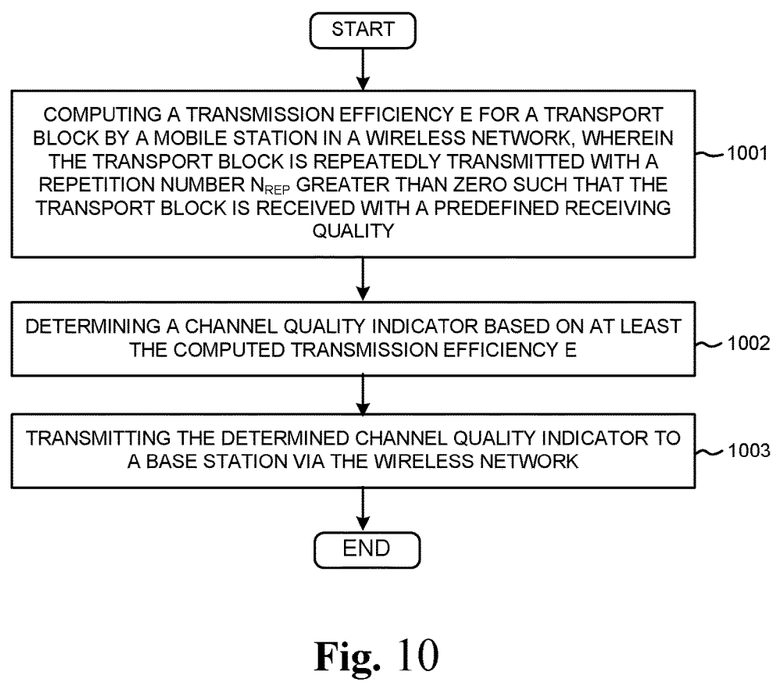
FIG. 10 is an exemplary flow chart for a UE to compute a transmission efficiency and send a channel status indicator based on the computed transmission efficiency.

FIG. 10 is an exemplary flow chart for a UE to compute a transmission efficiency and send a channel status indicator based on the computed transmission efficiency. At step 1001, the mobile station computes a transmission efficiency E for a transport block in a wireless network, wherein the transport block is repeatedly transmitted with a repetition number $n_{rep}$, greater than zero such that the transport block is received with a predefined receiving quality. At step 1002, the mobile station determines a channel quality indicator based on at least the computed transmission efficiency E. At step 1003, the mobile station transmits the determined channel quality indicator to a base station via the wireless network.

Figure 11:
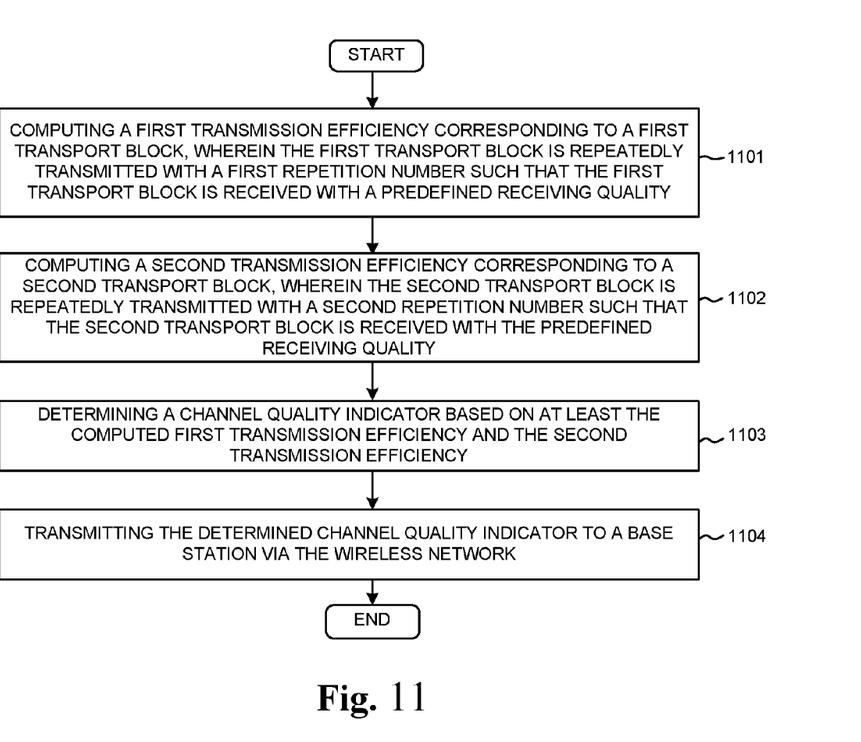
FIG. 11 is an exemplary flow chart for a UE to compute a first and a second transmission efficiencies and send a channel status indicator based on the first and the second transmission efficiencies.

FIG. 11 is an exemplary flow chart for a UE to compute a first and a second transmission efficiencies and send a channel status indicator based on the first and the second transmission efficiencies. At step 1101, the mobile station computes a first transmission efficiency corresponding to a first transport block, wherein the first transport block is repeatedly transmitted with a first repetition number such that the first transport block is received with a predefined receiving quality. At step 1102, the mobile station computes a second transmission efficiency corresponding to a second transport block, wherein the second transport block is repeatedly transmitted with a second repetition number such that the second transport block is received with the predefined receiving quality. At step 1103, the mobile station determines a channel quality indicator based on at least the computed first transmission efficiency and the second transmission efficiency. At step 1104, the mobile station transmits the determined channel quality indicator to a base station via the wireless network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
   generating a transmission efficiency E for a transport block by a mobile station in a wireless network, wherein the transport block is repeatedly transmitted with a repetition number $n_{rep}$ greater than zero such that the transport block is received with a predefined receiving quality, wherein the transmission efficiency E is related to a number $n_{er}$ of resource elements used in each repetition and cell-specific or channel state information reference signals received over multiple subframes;
   creating a channel quality indicator based on at least the generated transmission efficiency E; and
   transmitting the channel quality indicator to a base station via the wireless network.

2. The method of claim 1, wherein the transport block is repeatedly transmitted over multiple subframes.

3. The method of claim 1, wherein the pre-defined receiving quality is a pre-defined block error probability.

4. The method of claim 1, wherein the transmission efficiency E is computed based on a size S of the transport block, the number $n_{er}$ of resource elements used in each repetition, and the repetition number $n_{rep}$.

5. The method of claim 4, wherein the transmission efficiency E is determined by:

$$E=S/(n_{er}*n_{rep}).$$

6. The method of claim 4, wherein the computation of the transmission efficiency E is further based on one or more transmission parameters comprising: a modulation order, a transmission mode, a coding scheme, and a redundancy version number.

7. The method of claim 4, wherein the channel quality indicator indicates the repetition number $n_{rep}$ corresponding to the size S of the transport block.

8. The method of claim 4, wherein the channel quality indicator indicates the size S of the transport block corresponding to the repetition number $n_{rep}$.

9. The method of claim 4, wherein the size S is dynamically determined by the mobile station.

10. The method of claim 4, wherein the size S is predefined.

11. The method of claim 4, wherein the size S is configured by a higher-layer message from the base station.

12. The method of claim 4, wherein the repetition number $n_{rep}$ is dynamically determined by the mobile station.

13. The method of claim 4, wherein the repetition number $n_{rep}$ is predefined.

14. The method of claim 4, wherein the repetition number $n_{rep}$ is configured by a higher-layer message from the base station.

15. A method, comprising:
    generating a first transmission efficiency corresponding to a first transport block, wherein the first transport block is repeatedly transmitted with a first repetition number such that the first transport block is received with a predefined receiving quality, and wherein the first transmission efficiency is related to a number of resource elements used in the first transport block and cell-specific or channel state information reference signals received over multiple subframes of the first transport block;
    generating a second transmission efficiency corresponding to a second transport block, wherein the second transport block is repeatedly transmitted with a second repetition number such that the second transport block is received with the predefined receiving quality, and wherein the second transmission efficiency is related to a number of resource elements used in the second transport block and cell-specific or channel state information reference signals received over multiple subframes of the second transport block;
    creating a channel quality indicator based on at least the generated first transmission efficiency and the second transmission efficiency; and
    transmitting the determined channel quality indicator to a base station via the wireless network.

16. The method of claim 15, wherein the channel quality indicator corresponds to the highest transmission efficiency.

17. The method of claim 15, wherein the channel quality indicator corresponds to each of the transmission efficiency.

18. A user equipment (UE) comprising:
    a transceiver module that transmits and receives radio signals in a wireless network;
    a transmission efficiency handler that generates one or more transmission efficiencies $E_i$ for one or more corresponding transport blocks, wherein at least one transport block is repeatedly transmitted with a corresponding repetition number $n_{rep\_i}$ greater than zero such that each transport block is received with a pre-defined receiving quality, and wherein the transmission efficiencies for each repeated transmitted transport block is related to a number of resource elements used in corresponding transport block and cell-specific or channel state information reference signals received over multiple subframes; and
    a channel quality indicator handler that creates one or more channel quality indicators based on at least the one or more transmission efficiencies.

19. The UE of claim 18, wherein at least one transport block is repeatedly transmitted over multiple subframes.

20. The UE of claim 18, wherein the pre-defined receiving quality is a pre-defined block error probability.

21. The UE of claim 18, wherein the transmission efficiency handler computes each transmission efficiency $E_i$ based on a corresponding size $S_i$ of the corresponding transport block, a corresponding number $n_{er\_i}$ of resource elements used in each repetition, and the corresponding repetition number $n_{rep\_i}$.

22. The UE of claim 21, wherein the transmission efficiency handler determines each corresponding $E_i$ following:

$$E_i=S_i/(n_{er\_i}*n_{rep\_i}).$$

23. The UE of claim 21, wherein the transmission efficiency handler, in computing each $E_i$, further based on one or more transmission parameters comprising: a modulation order, a transmission mode, a coding scheme, and a redundancy version number.

24. The UE of claim 18, wherein the channel quality indicator handler determines one channel quality indicator corresponding to the highest transmission efficiency.

25. The UE of claim 18, wherein the channel quality indicator handler determines one or more channel quality indicators each corresponding to the $E_i$.

* * * * *